Dec. 6, 1966   J. M. ROBERTSON   3,290,224
NUCLEAR REACTOR FUEL ELEMENTS
Filed March 1, 1965
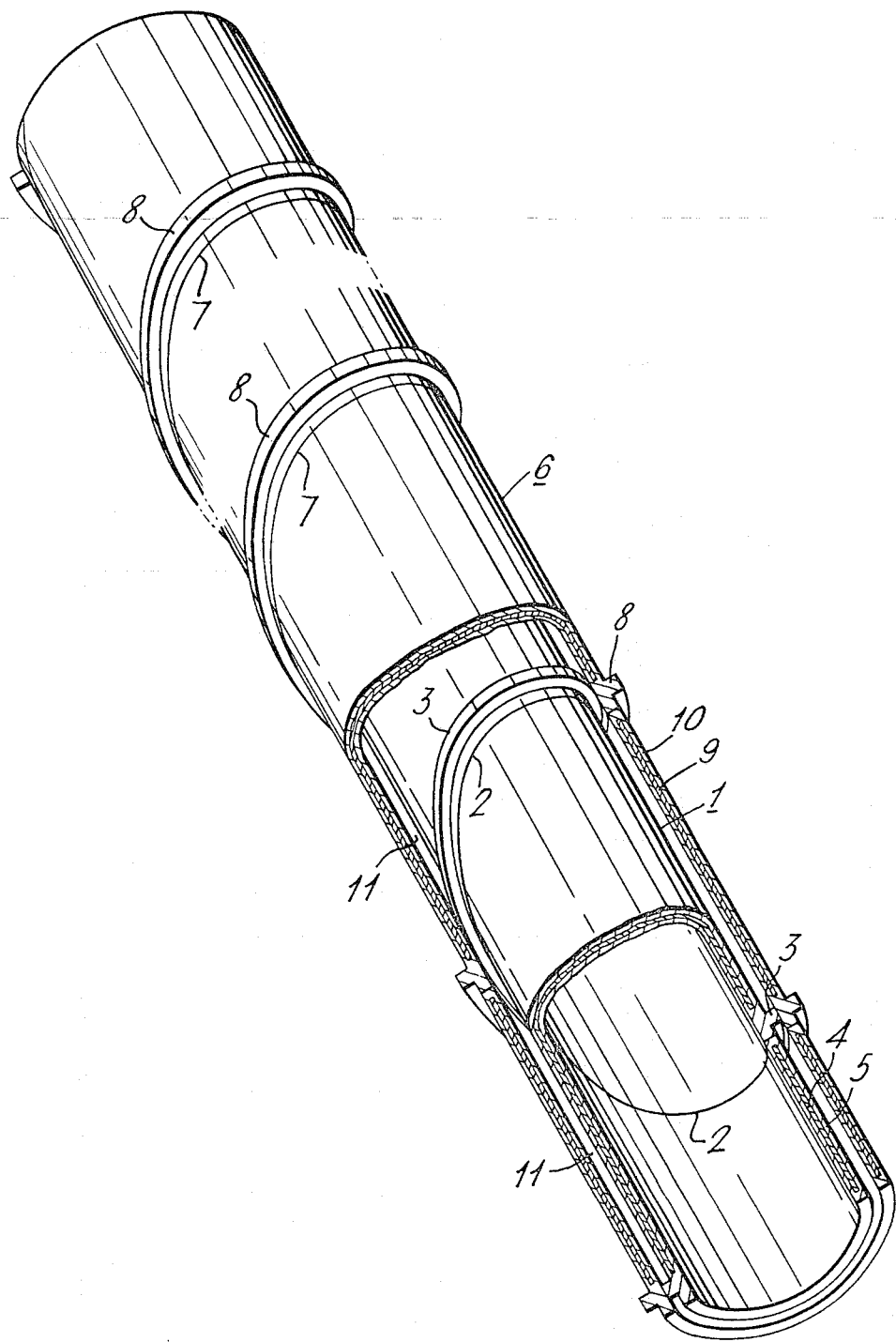

United States Patent Office 3,290,224
Patented Dec. 6, 1966

3,290,224
NUCLEAR REACTOR FUEL ELEMENTS
James Martin Robertson, Thurso, Caithness, Scotland, assignor to United Kingdom Atomic Energy Authority, London, England
Filed Mar. 1, 1965, Ser. No. 436,015
Claims priority, application Great Britain, Mar. 20, 1964, 11,970/64
6 Claims. (Cl. 176—81)

This invention relates to nuclear reactor fuel elements.

Known types of nuclear reactor fuel elements include that in which nuclear fuel material is enclosed in a protective sheath. The fuel material may be of rod form contained within a tubular sheath closed by end plugs or caps to give a fuel element of cylindrical configuration. Alternatively the nuclear fuel material and sheath may be of sheet form to provide a fuel element of plate-like configuration.

According to one aspect of the present invention a nuclear reactor fuel element comprises a helically wound strip of protectively clad nuclear fuel material, adjacent edges of the winding being joined together to form a tube.

The adjacent edges may be arranged in abutting or overlapping relationship, these edges being joined together as for example by welding, brazing or interlocking engagement between them, thereby forming a tube with a helical seam.

According to another aspect of the present invention, a nuclear reactor fuel element is of a multi-layer construction, the layers being spaced one from another and each comprising a helically wound strip of protectively clad nuclear fuel material, adjacent edges of the winding being joined together.

Adjacent the seam each strip preferably has an upstanding rib, the ribs contacting an adjacent layer thereby serving to space the layers one from another.

The dimensions of the strips are preferably correlated from layer to layer so that the seams and ribs lie in corresponding positions in the multi-layer construction. That is, the seams and ribs of each layer are concentrically arranged with the seams and ribs, respectively, of each other layer.

The present invention thus embraces the production of a nuclear reactor fuel element of generally circular configuration in cross-section by helically winding strip stock in the form of a protectively clad sheet of nuclear fuel material, and joining adjacent edges of the winding to form a tube.

The single figure of the accompanying exemplifying drawing is a partly cut-away perspective view of a fuel element made in accordance with the invention.

In one example of a fuel element in accordance with the invention the fuel material such as natural or enriched uranium alloyed with aluminium has a protective cladding such as aluminium. For the purpose of the present invention it is to be understood that the strip stock is of the so-called sandwich or picture-frame form, that is to say each sheet of nuclear fuel material is completely enclosed by protective cladding material which extends over the faces, and beyond the lateral edges and ends of the nuclear fuel material. Lengths of such strip stock are conveniently formed with an effectively integral upstanding rib of rectangular or other suitable cross-section on one face of the protective cladding, the rib being attached to one face of the strip as by welding so as to extend along the length of the strip adjacent to one side edge thereof. A first length of the ribbed strip stock is helically wound or wrapped on a former or mandrel in the form of a rod of circular cross-section, the unribbed face of the strip being applied to the rod. The helical winding of the strip is carried out so that adjacent edges are arranged in abutting or overlapping relationship, and these edges are then joined together as for example by welding, brazing or interlocking engagement between them thereby to form a tube with a helical seam. In this way the rib also takes up a helical path adjacent to the seam. The drawing shows a tube 1 with a helical seam 2 and an external upstanding spacer rib 3 formed in this way, adjacent abutting edges having been welded together. The tubular fuel element thus prepared has fuel material 4 enclosed by cladding material 5.

To form a fuel element of multi-layer construction, a second length of ribbed strip stock is similarly wound and joined along its adjacent edges, the mandrel used for the second strip being of increased diameter as compared with the mandrel used for the first strip so that the inner diameter of the second helically wound strip is effectively equal to the outer diameter of the rib on the first helically wound strip. Furthermore the width dimensions of the second length of strip stock is correlated with that of the first so that with the second strip assembled with its inner face in contact with the rib on the first strip, the seams and ribs of the two strips lie in corresponding positions in the multi-layer construction. In other words the width of the second strip is increased compared with that of the first strip so that both strips have the same pitch at their different diameters. The drawing shows a two-tube fuel element made in this way and comprising the tube 1 and an outer tube 6 having a helical seam 7 and an external upstanding spacer rib 8. The tube 6 has fuel material 9 enclosed in cladding material 10, and the seam 7 and rib 8 lie in positions corresponding to the seam 2 and spacer 3 respectively.

Other layers can be built up in a similar manner, and the outer faces of the ribs may be coated with brazing material so that on heating the assembly the ribs are bonded to the strip faces with which they make contact. Thus the rib 3 may be coated on its outer face with brazing material so that on heating, the rib 3 bonds to the inner face of the tube 6.

In this way there is provided a multi-tube fuel element of essentially circular configuration in cross-section, the spacer ribs serving to space apart the layers and to help define channels between the tubes (such as channel 11 between the tubes 1, 6) for flow of coolant lengthwise along the element when installed in a nuclear reactor. The fuel element is considered advantageous in that it incorporates the spatial and heat transfer characteristics of a circular configuration, whilst making use of plate-like fuel as a starting material. The joining together of adjacent edges to form a tube with a helical seam gives a robust construction.

A multi-layer construction in which the seams and spacer ribs occupy corresponding positions is preferred in that the rib on one tube does not contact or pass over fuel bearing portions of adjacent tubes and thereby restricts the possibility of local hot spots which might otherwise arise due to overheating. In this connection it is to be clearly understood that the rib (conveniently made of the cladding material) formed or attached along the length of and adjacent to the edge of the strip stock lies in the region of that portion of the protective cladding extending beyond the corresponding edge of the nuclear fuel material. Thus in the drawing the lower edge of the fuel material 4 lies above the level of the rib 3, and similarly for the fuel material 9 with respect to the ribs 8. The helical path of the channels defined by the spacer ribs and strips promotes a degree of coolant swirling which is again considered desirable from the point of view of heat transfer considerations.

The invention is not limited to the particular form of fuel element made as described above by way of example. Thus the opposing faces of each strip may be roughened as for example by knurling to increase heat transfer effects. Furthermore a tube may be formed from a number of strips wound side by side with adjacent edges joined together, and such a winding may be thought of as analogous to a multi-start screw thread. Also a multi-layer element may have alternate right-hand and left-hand wound layers. If desired each strip may have more than one spacer rib.

Each length of strip stock is conveniently formed with oppositely angled ends to give a tube with flat circular end faces. A single tube fuel element may be formed without a spacer rib and in the two-tube element shown in the drawings the rib 8 may be omitted. The ribs may be attached to the tubes along the seams as by welding if desired.

Purely by way of illustration, typical dimensions for a 24" long fuel element are as follows. Width of strip stock 3" to 4", internal diameter of innermost tube 1" to 2", and spacer rib 0.1" to 0.15" square in cross-section.

I claim:

1. A nuclear reactor fuel element comprising a helically wound strip of protectively clad nuclear fuel material, said protective cladding extending beyond the lateral edges of the nuclear fuel material, adjacent edges of the wound strip being joined together so as to form a tube.

2. A fuel element as claimed in claim 1, wherein the said adjacent edges are arranged in abutting relationship and are joined together so as to form a tube with a helical seam.

3. A nuclear reactor fuel element of multi-layer construction having at least a first layer and a second layer, the layers being spaced one from another, and each layer comprising a helically wound strip of protectively clad nuclear fuel material, adjacent edges of the wound strip of each layer being joined together so as to form a tube with a helical seam.

4. A fuel element as claimed in claim 3, wherein at least said first layer has an upstanding rib formed thereon, said rib contacting the said second layer to space the said first layer from the said second layer.

5. A fuel element as claimed in claim 4, wherein the said rib is formed on the strip at a portion of the protective cladding extending beyond the corresponding edge of the nuclear fuel material.

6. A fuel element as claimed in claim 5, wherein the dimensions of the strips are correlated from layer to layer so that the seams and ribs of each layer are concentrically arranged with the seams and ribs, respectively, of each other layer.

References Cited by the Examiner

UNITED STATES PATENTS

| | | | |
|---|---|---|---|
| 96,037 | 10/1869 | Root | 72—49 X |
| 1,987,164 | 1/1935 | Turnquist | 72—49 X |
| 2,968,601 | 1/1961 | Evans et al. | 176—90 X |
| 2,985,576 | 5/1961 | Hollings | 176—90 X |
| 3,041,855 | 7/1962 | Hanlein | 72—49 X |

FOREIGN PATENTS 898,849  6/1962  Great Britain.

BENJAMIN R. PADGETT, *Primary Examiner.*

M. J. SCOLNICK, *Assistant Examiner.*